United States Patent
Oh et al.

(10) Patent No.: US 8,532,029 B2
(45) Date of Patent: Sep. 10, 2013

(54) TNL CONNECTION SETUP METHOD AND APPARATUS FOR BASE STATION USING DOWNLINK RECEIVER

(75) Inventors: Sang Chul Oh, Daejeon (KR); Seung-Que Lee, Daejeon (KR); Hyung Deug Bae, Daejeon (KR); Jun Sik Kim, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 380 days.

(21) Appl. No.: 12/849,253

(22) Filed: Aug. 3, 2010

(65) Prior Publication Data

US 2011/0141972 A1    Jun. 16, 2011

(30) Foreign Application Priority Data

Dec. 15, 2009    (KR) .................. 10-2009-0124837

(51) Int. Cl.
*H04W 40/00*   (2009.01)
(52) U.S. Cl.
USPC ............ 370/328; 370/338; 370/332; 370/331
(58) Field of Classification Search
USPC ......... 370/328, 329, 338, 332, 331; 455/446, 455/436, 444, 443, 525, 450, 418
See application file for complete search history.

(56) References Cited

U.S. PATENT DOCUMENTS

| | | | |
|---|---|---|---|
| 8,254,982 B2 * | 8/2012 | Kuningas | 455/525 |
| 2007/0097938 A1 | 5/2007 | Nylander et al. | |
| 2007/0291770 A1 * | 12/2007 | Kitazoe | 370/395.52 |
| 2009/0047968 A1 * | 2/2009 | Gunnarsson et al. | 455/446 |
| 2009/0129291 A1 * | 5/2009 | Gupta et al. | 370/254 |
| 2009/0131018 A1 | 5/2009 | Osborn | |
| 2009/0310703 A1 | 12/2009 | Han et al. | |
| 2010/0075681 A1 * | 3/2010 | Olofsson et al. | 455/436 |
| 2010/0105395 A1 * | 4/2010 | Ji et al. | 455/444 |
| 2010/0178912 A1 * | 7/2010 | Gunnarsson et al. | 455/423 |
| 2010/0234028 A1 * | 9/2010 | Narasimha et al. | 455/437 |
| 2010/0291934 A1 * | 11/2010 | Lopes | 455/446 |
| 2011/0143743 A1 * | 6/2011 | Pollakowski et al. | 455/422.1 |
| 2011/0263282 A1 * | 10/2011 | Rune et al. | 455/507 |

FOREIGN PATENT DOCUMENTS

| | | |
|---|---|---|
| KR | 1020090037891 | 4/2009 |
| KR | 10-2009-0099515 | 9/2009 |
| KR | 1020090112260 | 10/2009 |
| KR | 1020090112337 | 10/2009 |
| WO | 2007/149767 A2 | 12/2007 |
| WO | 2009/127631 A1 | 10/2009 |

OTHER PUBLICATIONS

Korean Office Action for Application No. 10-2009-0124837, 4 pages, dated Jan. 1, 2013.
Korean Office Action for Application No. 10-2009-0124837, 5 pages, dated Jul. 30, 2013.

* cited by examiner

*Primary Examiner* — Rasheed Gidado
(74) *Attorney, Agent, or Firm* — Nelson Mullins Riley & Scarborough LLP

(57) ABSTRACT

A Transport Network Layer (TNL) connection setup method for a base station includes monitoring Physical Cell Identity (PCI) values of neighboring cells. When it is monitored that the PCI values are changed, IP addresses of neighboring base stations corresponding to the changed PCI values are acquired. Thereafter, it is determined whether it is necessary to perform a new TNL connection setup with respect to other neighboring base stations, based on the changed PCI values and the acquired IP addresses. When it is determined that it is necessary to perform the new TNL connection setup, the TNL connection setup is performed with the acquired IP addresses.

18 Claims, 4 Drawing Sheets

TNL CONNECTION SETUP METHOD AND APPARATUS FOR BASE STATION USING DOWNLINK RECEIVER

CROSS-REFERENCE(S) TO RELATED APPLICATION(S)

The present invention claims priority of Korean Patent Application No. 10-2009-0124837, filed on Dec. 15, 2009, which is incorporated herein by reference.

FIELD OF THE INVENTION

The present invention relates to a Transport Network Layer (TNL) connection setup method and apparatus for a base station using a downlink receiver. In particular, the present invention relates to a TNL connection setup method and apparatus for a base station, which can stably and automatically set a connection with neighboring nodes, without using an S1 interface message with respect to a Mobility Management entity (MME) or a Serving-GateWay (S-GW), without help of a user equipment (UE) connected to the base station, and without influencing the transmission/reception of data at the time of the TNL connection setup.

BACKGROUND OF THE INVENTION

With the recent advance of information communication and the distribution of multimedia technologies, much discussion has been made about the base station technologies which install the base stations in the homes or offices and connect the base stations to a mobile communication network in a form of a convergence with an existing network, while guaranteeing mobility and high-capacity transmission. Also, regarding the base stations, there is a need for a new mobile communication service technology which provides the expansion of a mobile communication service area, the improvement in performance of a user service, and the increase in capacity of a base station and also supports a variety of cheap mobile communication services for users.

With such a trend, a Fixed Mobile Convergence (FMC) service and a Fixed Mobile Substitution (FMS) service started in earnest. The FMC service provides a service which can make a call with single user equipment (UE) outdoors through a connection to a mobile communication network and indoors through a public switched telephone network or IP network. The FMS service provides a service which uses a mobile communication network but can partially substitute for a wired service by making a charge for a mobile communication cheaper than that for a wired communication at a specific place, e.g., in the house. To this end, it is necessary to study technologies which increase the capacity of the base stations and optimize the cell coverage by minimizing interference between neighboring base stations within themselves or through the automatic cooperation of the neighboring base stations when new base station cells are installed.

In particular, an ultra-small base station, i.e., a femtocell, has attracted attention as an approach which can actively cope with a user's demand under an environment where a cell radius is extremely minimized up to a room space inside the home or office, reduce the service provider's capital expenditure (CAPEX) and operational expenditure (OPEX) by saving the time necessary to install an additional cell and the operational costs, and provide a radio environment, considering an equipment manufacture's new market creation and improvement in the quality of user services. The demand for femtocell standardization was proposed as a standardization item in the 3rd Generation Partnership Project (3GPP) in the early 2007, and femtocell standardization activities have been carried out as the main issue in the 3GPP2 since June 2007. The femtocell is referred to as a Home Node B (HNB) in the 3GPP, and the discussion is actively in progress about the standardizations of 3G HNB based on WCDMA and Long Term Evolution (LTE) Home evolved Node B (HeNB) based on LTE under TSG-RAN WG4.

Also, in the 3GPP2, methods for minimizing the influence of the existing networks and the interfaces between macrocells have become a main issue. While various problems such as a network architecture for CS/PS service, an interface management, a handover scheme, an access system selection, a synchronization, etc., have been under discussion, the 3GPP2 having first carried out the standardization activities took the leading position in the femtocell standardization over the 3GPP.

The femtocell technology can give several meanings to users and service providers. The service providers can provide a high-capacity service, which has been provided in an existing wired broadband service, at a low cost under radio environments by configuring cells in a small size and remarkably increasing a frequency reuse rate, and the users can receive a high-speed data service, regardless of places. Hence, such a femtocell technology provided the foundation for introduction of new services and expansion of next generation mobile communication markets following 3G.

In addition, the standardization of a Self Organizing Network (SON) technology has just been discussed. According to the SON technology, a base station configuration is automatically set when a new base station is installed, and operation information is automatically optimized by exchanging data related to a radio environment between neighboring base stations and UEs during operations, whereby the capacity of the base stations can be increased and the coverage can be expanded. The standardization of the SON technology was chosen as a study item in the 3GPP and is in progress. The extensive discussion was actively made in 2009 and it is expected that practical markets will be established after 2012.

In the SON technology of LTE-Advanced femtocells, there are a base station self-configuration technology and a base station self-optimization technology. The base station self-configuration technology generates installation parameters within itself according to the internal structure of the base station when the base station 120 is additionally installed, and performs the initial automatic installation of the base station, the identification of neighboring base stations before an operation step, relationship setup/registration, and a connection setup with respect to a core network. The base station self-optimization technology controls the base station signal intensity and optimizes the handover parameters by using signals between the neighboring base stations and traffic type information. In addition to such technologies, the LTE-Advanced femtocells apply mobility technology, a femtocell base station selection technology using a Closed Subscriber Group (CSG), and an inter-cell interference avoidance technology.

In this regard, a dynamic TNL connection setup technology of the femtocells is also treated as an important technology.

Conventionally, a base station establishes an S1 TNL connection with a Mobility Management Entity (MME) by using an initial remote IP endpoint manually inputted, and acquires TNL addresses of neighboring base stations through the MME. In this manner, an X2 TNL connection setup with the neighboring nodes is achieved. This method increases a signaling load of a network. Such a signaling load is a more serious problem in an environment where an uncoordinated, random and dense installation is frequently repeated. The signaling load may occur in macrocell base stations as well as the femtocell base stations. In the case of femtocell base stations, the signaling load is more fatal because installation/removal and power on/off are randomly conducted.

SUMMARY OF THE INVENTION

In view of the foregoing, therefore, the present invention solves a complicated, frequent dynamic TNL connection setup problem by using a separate downlink receiver.

Further, the present invention provides an apparatus for a dynamic TNL connection setup, without using an S1 interface with respect to an MME, without help of a UE, and without influencing transmission/reception of other data.

Further, the present invention provides an apparatus for an automatic TNL connection setup with respect to neighboring nodes within a base station itself through only an interworking with a SON server.

In accordance with an aspect of the present invention, there is provided a Transport Network Layer (TNL) connection setup method for a base station, which includes:

monitoring Physical Cell Identity (PCI) values of neighboring cells;

when it is monitored that the PCI values are changed, acquiring IP addresses of neighboring base stations corresponding to the changed PCI values;

determining whether it is necessary to perform a new TNL connection setup with respect to the neighboring base stations, based on the changed PCI values and the acquired IP addresses; and when it is determined that it is necessary to perform the new TNL connection setup, attempting the TNL connection setup with the acquired IP addresses.

In accordance with another aspect of the present invention, there is provided a Transport Network Layer (TNL) connection setup apparatus for a base station, which includes:

a downlink receiver for acquiring Physical Cell Identity (PCI) values of neighboring cells;

a Self Organizing Network (SON) agent for acquiring IP addresses of neighboring base stations corresponding to changed PCI values when it is monitored that the PCI values are changed; and a base station control unit for determining whether it is necessary to perform a new TNL connection setup with respect to the neighboring base stations, based on the changed PCI values and the acquired IP addresses, and attempting the TNL connection setup with the acquired IP addresses when it is determined that it is necessary to perform the new TNL connection setup.

The base station includes any one of a femtocell base station, a macrocell base station, a Home enhanced Node B (HeNB) and an enhanced Node B (eNB).

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
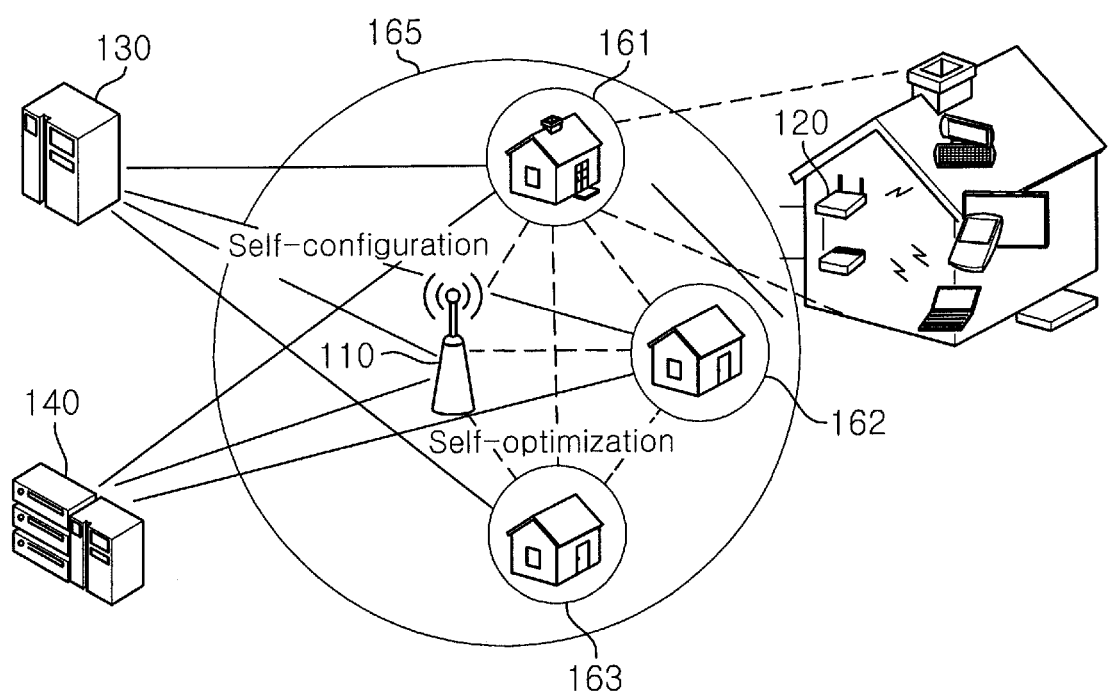
FIG. 1 is a conceptual diagram showing the architecture of an LTE-advanced system to which an embodiment of the present invention is applied.

FIG. 1 is a conceptual diagram showing the architecture of an LTE-advanced system to which embodiments of the present invention is applied. The LTE-advanced system includes a macrocell base station 110, a plurality of LTE-Advanced femtocell base stations 120, a network management server 130, and an Evolved Packet Core (EPC) 140. In the LTE-advanced system, an LTE-Advanced macrocell 165 is formed by the macrocell base station or enhanced Node B (eNB) 110, and a plurality of femtocells 161, 162 and 163 is formed by the plurality of femtocell base station or Home enhanced Node B (HeNB) 120.

Figure 2:
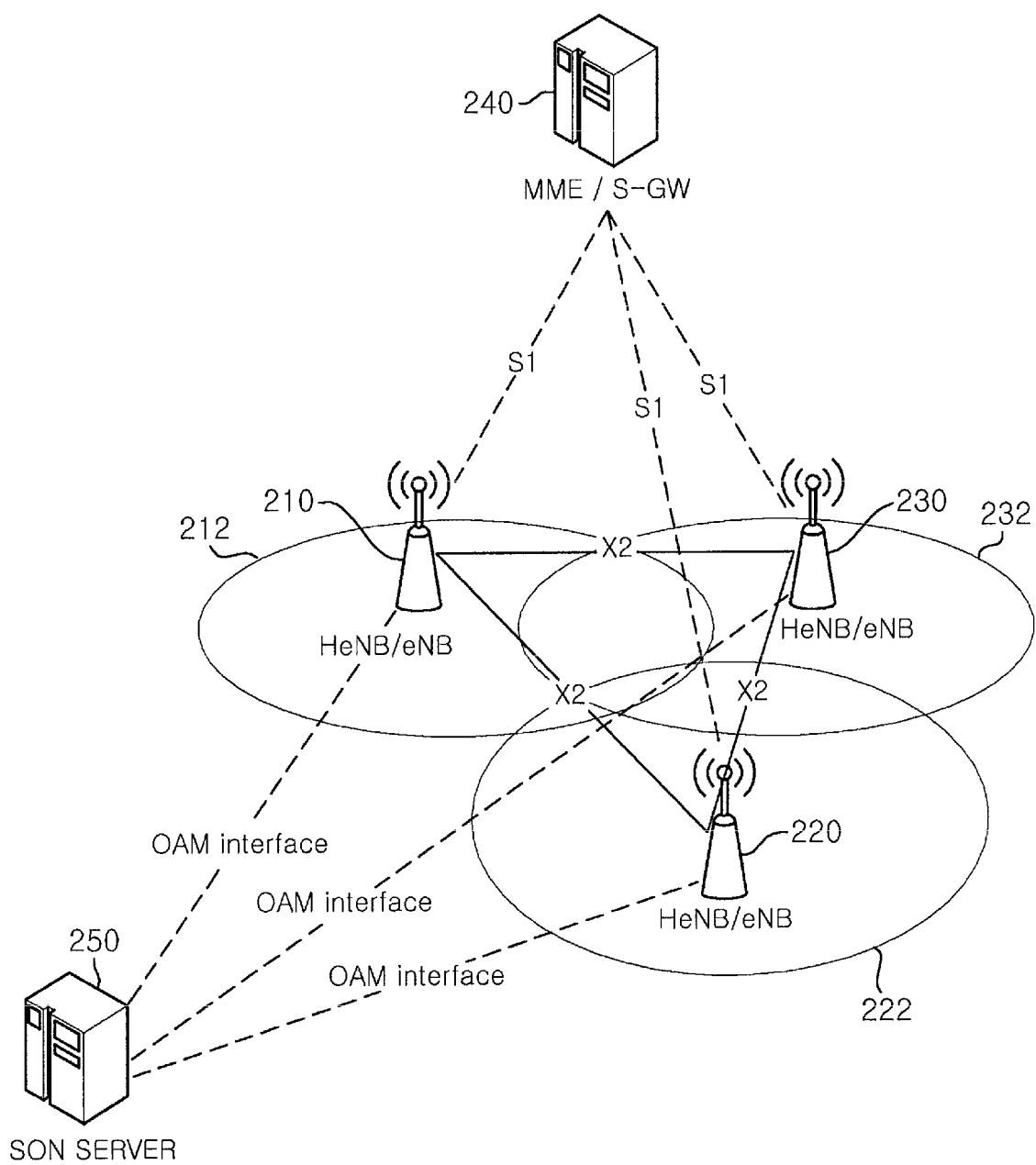
FIG. 2 is a conceptual diagram showing the architecture of an Evolved-Universal Terrestrial Radio Access Network (E-UTRAN) system to which an embodiment of the present invention is applied.

FIG. 2 is a conceptual diagram showing the architecture of an Evolved-Universal Terrestrial Radio Access Network (E-UTRAN) system of an LTE-advanced system to which embodiments of the present invention is applied. The E-UTRAN system includes a plurality of base stations 210, 220 and 230, a Mobility Management Entity (MME)/Serving-Gate-Way (S-GW) 240, and a Self Organizing Network (SON) server 250. In the E-UTRAN system, a plurality of cells 212, 222 and 232 is formed by the plurality of base stations 210, 220 and 230.

In the embodiments of the present invention, it is assumed that a cell is a femtocell and a base station is a femtocell base station or HeNB (Home enhanced Node B), but not limited thereto. The embodiments of the present invention can also be applied to a macrocell and a macrocell base station or eNB (enhanced Node B). In this case, each of the base stations 210, 220 and 230 corresponds to a combination of the macrocell base station (or eNB) and the femtocell base station (or HeNB) shown in FIG. 1.

The MME/S-GW 240, which corresponds to the EPC 140 as shown in FIG. 1, manages a mobility support on a control plane and a data plane between 3GPP-based access networks. The interface between the base stations 210, 220 and 230 and the MME 240 supports the mobility of the control plane. In the case of the LTE, the interface is achieved by newly defining S1-AP based on SCTP which is an IP-based transport protocol. In the case of the 2G and 3G access networks, a GPRS Tunneling Protocol Control (GTP-C) protocol is used for a mobility management signaling. The interface between the base stations 210, 220 and 230 and the S-GW 240 supports the mobility of the data plane. For the LTE system, the data transfer between the base station 210, 220 and 230 and the S-GW 240 is achieved by using a GTP-U protocol. The 2G (2nd Generation)/3G (3rd Generation) system also has the same protocol stack.

Each of the base stations 210, 220 and 230 has an S1 connection with the MME/S-GW 240 and has an X2 connection with its neighboring base stations. The S1 connection includes an S1 TNL connection, and the X2 connection includes an X2 TNL connection. Also, each of the base stations 210, 220 and 230 has an Operation, Administration and Maintenance (OAM) connection with the SON server 250 in order to acquire the IP addresses of its neighboring base stations. A separate base station may be added to or removed from the E-UTRAN system. Specifically, in the case of the femtocells, the addition/removal and the power on/off of the base stations may be randomly conducted.

The SON server 250, which corresponds to the network management server 130 shown in FIG. 1, has the IP addresses of all the base stations 210, 220 and 230. The SON server 250 performs a self-configuration and a self-optimization in the cells 212, 222 and 232 and the E-UTRAN system. During the self-configuration, IP address setup of the Base stations, OAM detection, authentication, gateway setup, software download, neighbor list setup, parameter setup related to service area and capacity are conducted by the SON server 250. During the self-optimization, the neighbor list is optimized and the service area and capacity are optimized. The SON server 250 manages a list of IP addresses of the base stations 210, 220 and 230 in a list form. When there is a change in the base stations, for example, a base station is newly added or removed, the neighbor list may be updated in real time.

Figure 3:
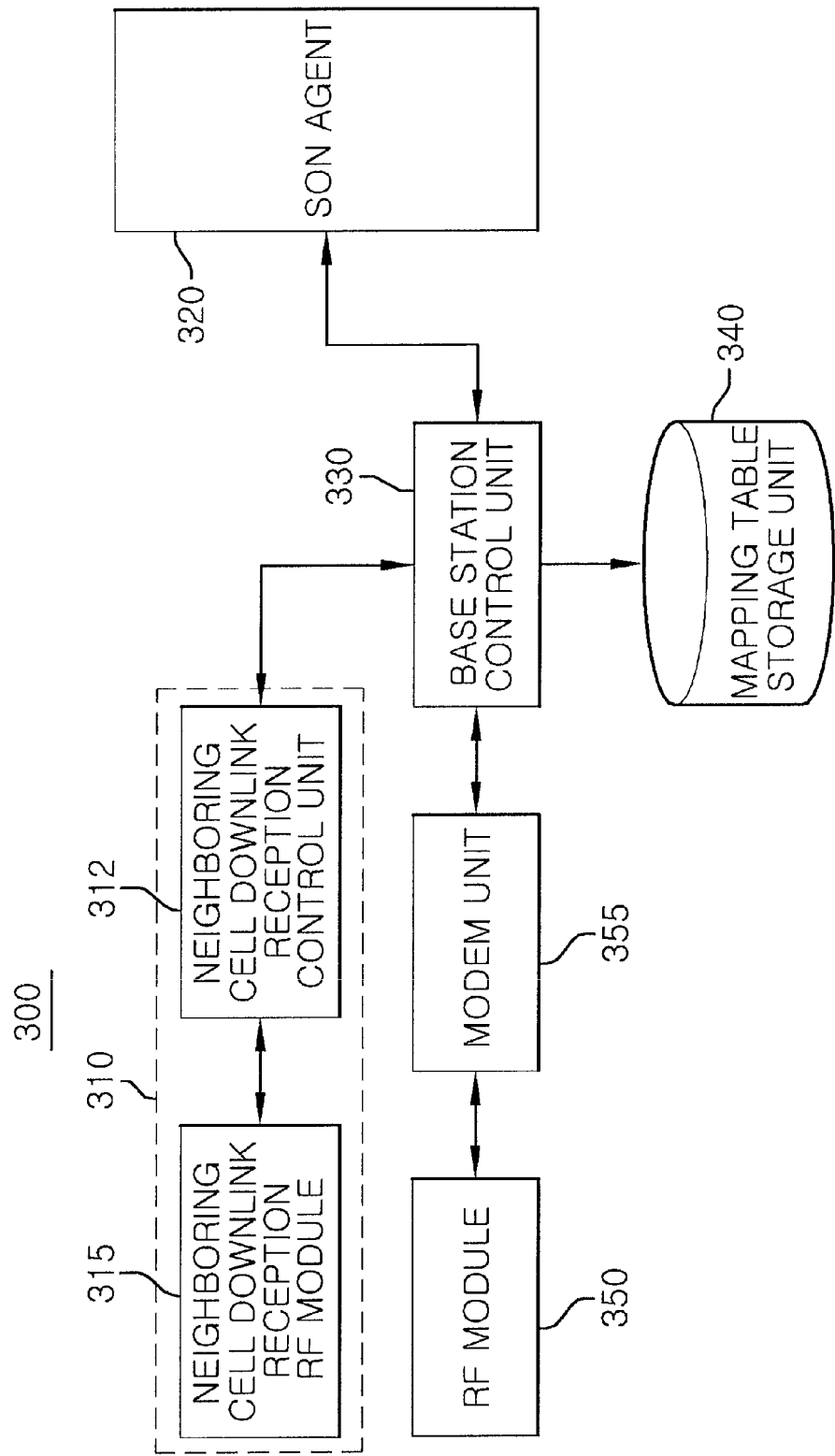
FIG. 3 is a block diagram of a TNL connection setup apparatus for a base station in accordance with an embodiment of the present invention.

FIG. 3 is a block diagram of a TNL connection setup apparatus for a base station in accordance with an embodiment of the present invention.

The TNL connection setup apparatus may be installed in the respective base stations 210, 220 and 230 and includes a downlink receiver 310, an SON agent 320, a base station control unit 330, an RF module 350, a modem unit 355, and a mapping table storage unit 340. It is understood that the TNL connection setup apparatus is incorporated with any components in the base station or installed separately from the base station.

The RF module 350 and the modem unit 355 perform the signal processing and data transmission/reception functions with a user equipment (UE) (not shown) or a neighboring base station.

The downlink receiver 310 is provided with a neighboring cell downlink reception unit 312 and a neighboring cell downlink reception RF module 315, and acquires Physical Cell Identity (PCI) values of the neighboring cells. The neighboring cell downlink reception RF module 315 receives RF signals related to the synchronization channels of the neighboring cells. The neighboring cell downlink reception control unit 312 monitors synchronization channels of the neighboring cells through the neighboring cell downlink reception RF module 315, and acquires the PCI values of the neighboring cells by using Primary Synchronization Code (PSC) values and Secondary Synchronization Code (SSC) values of the synchronization channels. The neighboring cell downlink reception control unit 312 transfers information about the acquired PCI values of the neighboring cells to the base station control unit 330.

In the embodiment of the present invention, the neighboring cell downlink reception RF module 315 and the neighboring cell downlink reception control unit 312 which are exclusively responsible for the neighboring cell downlink reception function are provided separately from the RF module 350 and the modem unit 355 which manage the signal processing and data transmission/reception function. Therefore, the respective base stations can continuously monitor the change in the PCI values of the neighboring cells, while the RF module 350 and the modem unit 355 are transmitting/receiving data. Consequently, the dynamic X2 TNL connection setup with respect to the neighboring nodes can be independently managed.

The SON agent 320 manages an OAM interface for interworking with the SON server 250. When the neighboring cell downlink reception control unit 312 obtains the monitoring result that the PCI values of the neighboring cells are changed, the SON agent 320 acquires the IP addresses of the neighboring base stations corresponding to the changed PCI values from the SON server 250. When the monitoring result is that the PCI values are changed, the SON agent 320 requests to the SON server 205 the IP addresses of the neighboring base stations corresponding to the changed PCI values, and receives from the SON server 250 the IP addresses of the neighboring base stations corresponding to the changed PCI values. Alternatively, the SON agent 320 may transfer a list of the PCI values, including the changed PCI values, to the SON server 250, and receive the list of the IP addresses of the neighboring base stations corresponding to the list of the PCI values.

The mapping table storage unit 340 stores a mapping table in which the PCI values of the neighboring cells and the IP addresses of the neighboring base stations are mapped. The mapping table stored in the mapping table storage unit 340 can be updated when the PCI values are changed and the IP addresses are acquired.

The base station control unit 330 determines whether it is necessary to perform a new TNL connection setup for X2 connection with respect to the neighboring base stations, based on the changed PCI values detected by the neighboring cell downlink reception control unit 312 and the IP addresses acquired by the SON agent 320. When it is determined that it is necessary to perform the new TNL connection setup, the TNL connection setup is attempted to the acquired IP addresses.

As set forth above, the TNL connection setup can be achieved by using only the OAM interface message with respect to the SON server 250, without using the S1 interface message with respect to the MME/S-GW 240, without help of the UE connected to the base station, and without influencing the transmission/reception of data, which are performed at the same time with the TNL connection setup.

Figure 4:
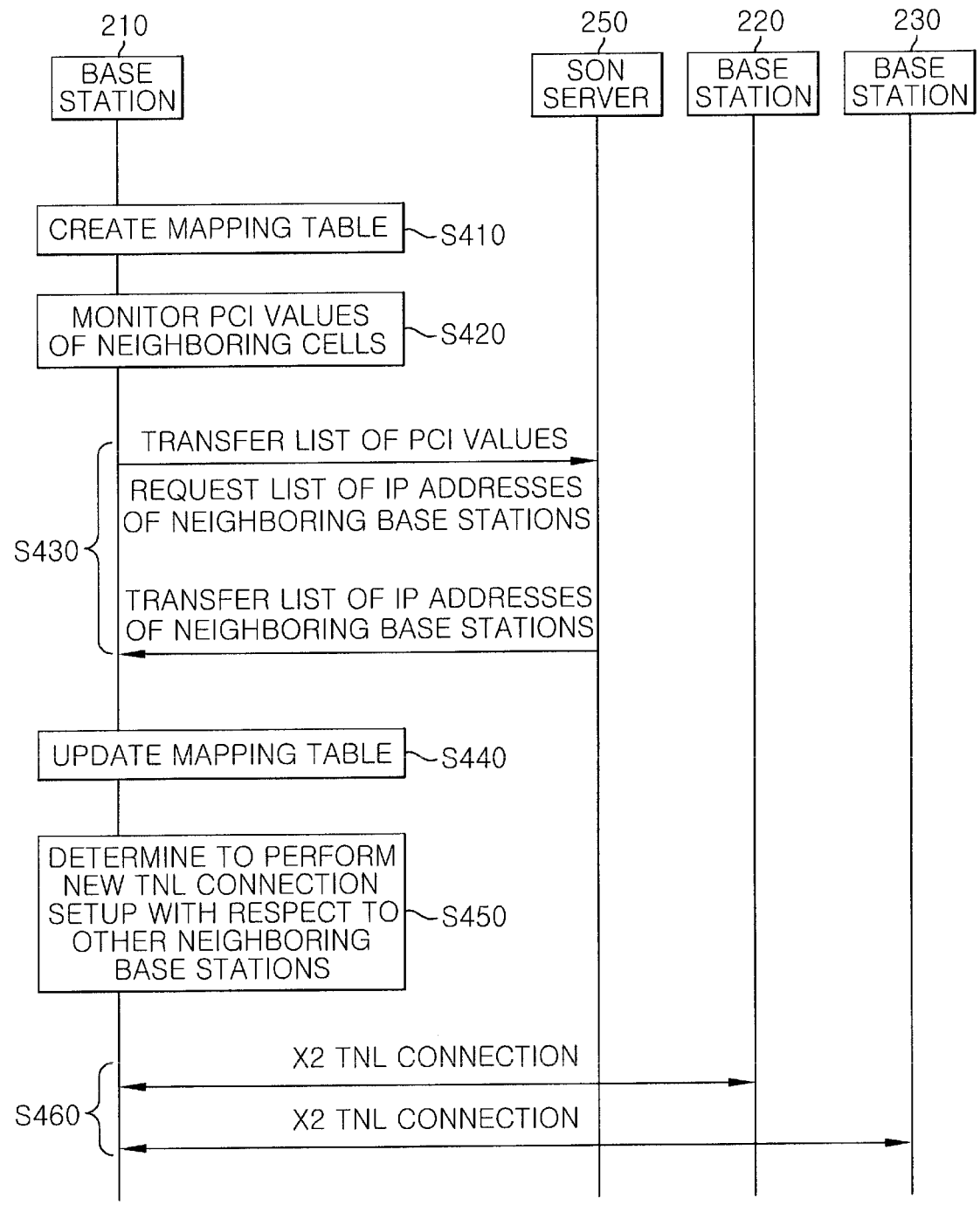
FIG. 4 is a schematic flow diagram of a TNL connection setup method for a base station in accordance with an embodiment of the present invention.

FIG. 4 is a schematic flow diagram of a TNL connection setup method in accordance with an embodiment of the present invention. The schematic flow diagram will be described with respect to any one, e.g., a base station 210 among the plurality of base stations 210, 220 and 230.

In step S410, the base station 210 creates a mapping table, in which PCI values of neighboring cells 222 and 232 and IP addresses of neighboring base stations 220 and 230 are mapped, by using the base station control unit 330 and the mapping table storage unit 340.

In step S420, the base station 210 continuously monitors the PCI values of the neighboring cells by using the downlink receiver 310. The PCI values of the neighboring cells 222 and 232 may be monitored through the synchronization channels of the neighboring cells 222 and 232. Specifically, the monitoring step S420 may include monitoring the synchronization channels of the neighboring cells 222 and 232, and acquiring the PCI values of the neighboring cells 222 and 232 by using the PSC values and the SSC values of the synchronization channels.

Thereafter, when it is monitored that the PCI values are changed, the base station 210 acquires the IP addresses of the neighboring base stations 220 and 230 corresponding to the changed PCI values by using the SON agent 320 and the SON server 250, in step S430. The acquiring of the IP addresses of the neighboring base stations 220 and 230 in step S430 may include requesting to the SON server 250 the IP addresses of the neighboring base stations corresponding to the changed PCI values when it is monitored that the PCI values are changed, and receiving from the SON server 250 the IP addresses of the neighboring base stations corresponding to the changed PCI values. The requesting of the IP addresses of the neighboring base stations may be achieved by transferring the list of the PCI values, including the changed PCI values through an OAM interface between the SON server 250 and the base station 210. The receiving of the IP addresses of the neighboring base stations may be achieved by receiving the list of the IP addresses of the neighboring base stations corresponding to the list of the PCI values through an OAM interface between the SON server 250 and the base station 210.

Subsequently, in step S440, the base station 210 may update the mapping table by using the changed PCI values acquired from the neighboring cell downlink reception control unit 312 and the neighboring cell downlink reception RF module 315, and the IP addresses acquired from the SON agent 320 and the SON server 250.

Next, in step S450, the base station 210 determines whether it is necessary to perform a new TNL connection setup with respect to other neighboring base stations, based on the changed PCI values and the acquired IP addresses, by using the base station control unit 330.

When it is determined that it is necessary to perform the new TNL connection setup with respect to the neighboring base stations, the base station 210 attempts the TNL connection setup to the acquired IP addresses in step S460. The TNL connection setup can be achieved by using only the OAM interface message with respect to the SON server 250, without using the S1 interface message with respect to the MME/S-GW 240, without help of the UE connected to the base station, and without influencing the transmission/reception of other data, which are performed at the same time with the TNL connection setup.

The embodiments of the present invention can provide the TNL connection setup method and apparatus which stably and automatically set the connection with the neighboring nodes through only the interworking of the downlink receiver and the SON server under the environment where the installation/removal and power on/off are randomly conducted in the femtocell.

Moreover, the base station can provide the dynamic TNL connection setup, without using the S1 interface message with respect to the MME or S-GW, without help of the UE, and without influencing the transmission/reception of other data, which are performed at the same time with the TNL connection setup.

The modules, functional blocks or units set forth above may be implemented with a variety of known elements, such as electronic circuits, integrated circuits, and Application Specific Integrated Circuits (ASICs), solely or in combination with two or more elements.

While the invention has been shown and described with respect to the preferred embodiments, it will be understood by those skilled in the art that various changes and modifications may be made without departing from the scope of the invention as defined in the following claims.

What is claimed is:
1. A computer-implemented Transport Network Layer (TNL) connection setup method performed in a base station, the base station equipped with an "Radio Frequency (RF)" module and modem unit that are used for performing signal processing and data transmission/reception with a user equipment or a neighboring base station, the method comprising:
monitoring, with a downlink receiver in the base station, Physical Cell Identity (PCI) values of neighboring cells, the downlink receiver separate from the RF module and modem unit that are used for performing signal processing and data transmission/reception;
when it is monitored that the PCI values are changed, acquiring "Internet Protocol (IP)" addresses of neighboring base stations corresponding to the changed PCI values;
determining whether it is necessary to perform a new TNL connection setup with respect to the neighboring base stations, based on the changed PCI values and the acquired IP addresses; and
when it is determined that it is necessary to perform the new TNL connection setup, attempting the TNL connection setup with the acquired IP addresses,
wherein the TNL connection setup is achieved without using an interface message with respect to a Mobility Management Entity (MME) or a serving-GateWay (S-GW), without help of a user equipment (UE) connected to the base station, and without influencing transmission/reception of other data, which are performed at the same time with the TNL connection setup.

2. The TNL connection setup method of claim 1, wherein the PCI values of the neighboring cells are monitored through synchronization channels of the neighboring cells.

3. The TNL connection setup method of claim 2, wherein said monitoring of the PCI values comprises:
monitoring the synchronization channels of the neighboring cells; and
acquiring the PCI values of the neighboring cells by using Primary Synchronization Code (PSC) values and Secondary Synchronization Code (SSC) values.

4. The TNL connection setup method of claim 3, wherein the IP addresses of the neighboring base stations are acquired from a Self Organizing Network (SON) server.

5. The TNL connection setup method of claim 4, wherein said acquiring of the IP addresses of the neighboring base stations comprises:
when it is monitored that the PCI values are changed, requesting to the SON server the IP addresses of the neighboring base stations corresponding to the changed PCI values; and
receiving from the SON server the IP addresses of the neighboring base stations corresponding to the changed PCI values.

6. The TNL connection setup method of claim 5, wherein said requesting of the IP addresses of the neighboring base stations is achieved by transferring a list of the PCI values, including the changed PCI values.

7. The TNL connection setup method of claim 6, wherein said receiving of the IP addresses of the neighboring base stations is achieved by receiving a list of the IP addresses of the neighboring base stations corresponding to the list of the PCI values.

8. The TNL connection setup method of claim 1, further comprising:
maintaining a mapping table in which the PCI values of the neighboring cells and the IP addresses of the neighboring base stations are mapped; and
updating the mapping table by using the changed PCI values and the acquired IP addresses.

9. The TNL connection setup method of claim 1, wherein the base station is any one of a femtocell base station, a macrocell base station, a Home enhanced Node B (HeNB) and an enhanced Node B (eNB).

10. A Transport Network Layer (TNL) connection setup apparatus for a base station, the base station equipped with an "Radio Frequency (RF)" module and modem unit that are used for performing signal processing and data transmission/reception with a user equipment or a neighboring base station, comprising:
- a downlink receiver for acquiring Physical Cell Identity (PCI) values of neighboring cells, the downlink receiver separate from the RF module and modem unit that are used for performing signal processing and data transmission/reception;
- a Self Organizing Network (SON) agent for acquiring "Internet Protocol (IP)" addresses of neighboring base stations corresponding to changed PCI values when it is monitored that the PCI values are changed; and
- a base station control unit for determining whether it is necessary to perform a new TNL connection setup with respect to the neighboring base stations, based on the changed PCI values and the acquired IP addresses, and attempting the TNL connection setup with the acquired IP addresses when it is determined that it is necessary to perform the new TNL connection setup, wherein the TNL connection setup is achieved without using an interface message with respect to a Mobility Management Entity (MME) or a Serving-GateWay (S-GW), without help of a user equipment (UE) connected to the base station, and without influencing transmission/reception of other data, which are performed at the same time with the TNL connection setup.

11. The TNL connection setup apparatus of claim 10, wherein the down link receiver comprises a neighboring cell downlink reception control unit for receiving synchronization channels of the neighboring cells to acquire the Physical Cell Identity (PCI) values of neighboring cells.

12. The TNL connection setup apparatus of claim 11, wherein the PCI values of the neighboring cells are required from Primary Synchronization Code (PSC) values and Secondary Synchronization Code (SSC) values of the synchronization channels.

13. The TNL connection setup apparatus of claim 12, wherein the SON agent acquires the IP addresses of the neighboring base stations from an SON server.

14. The TNL connection setup apparatus of claim 13, wherein the SON agent requests to the SON server the IP addresses of the neighboring base stations corresponding to the changed PCI values when it is monitored that the PCI values are changed, and receives from the SON server the IP addresses of the neighboring base stations corresponding to the changed PCI values.

15. The TNL connection setup apparatus of claim 14, wherein the SON agent transfers a list of the PCI values, including the changed PCI values, to the SON server.

16. The TNL connection setup apparatus of claim 15, wherein the SON agent receives a list of IP addresses of the neighboring base stations corresponding to the list of the PCI values from the SON server.

17. The TNL connection setup apparatus of claim 10, further comprising a storage unit storing a mapping table in which the PCI values of the neighboring cells and the IP addresses of the neighboring base stations are mapped, wherein the mapping table is updated by using the changed PCI values and the acquired IP addresses.

18. The TNL connection setup apparatus of claim 10, wherein the base station is any one of a femtocell base station, a macrocell base station, a Home enhanced Node B (HeNB) and an enhanced Node B (eNB).

* * * * *